(12) United States Patent
Ikeda (10) Patent No.: US 7,477,182 B2
(45) Date of Patent: Jan. 13, 2009

(54) PULSE RADAR SYSTEM

(75) Inventor: Hiroshi Ikeda, Tokyo (JP)

(73) Assignee: TDK Corporation, Tokyo (JP)

( * ) Notice: Subject to any disclaimer, the term of this patent is extended or adjusted under 35 U.S.C. 154(b) by 33 days.

(21) Appl. No.: 11/640,363

(22) Filed: Dec. 18, 2006

(65) Prior Publication Data
US 2007/0216567 A1    Sep. 20, 2007

(30) Foreign Application Priority Data
Dec. 19, 2005    (JP)    .............................. 2005-364202

(51) Int. Cl.
*G01S 7/34*    (2006.01)
*G01S 7/28*    (2006.01)
*G01S 13/00*    (2006.01)

(52) U.S. Cl. .............................. 342/92; 342/82; 342/89; 342/91; 342/118; 342/134; 342/175; 342/194; 342/195; 342/202

(58) Field of Classification Search .................. 342/82, 342/89, 91–93, 159–175, 192–197, 118, 342/128, 131, 132, 134–144, 202–205, 94–97; 375/316, 345
See application file for complete search history.

(56) References Cited

U.S. PATENT DOCUMENTS

| | | | | |
|---|---|---|---|---|
| 3,164,831 A | * | 1/1965 | Mraz ............................ | 342/92 |
| 3,495,244 A | * | 2/1970 | La Rosa ........................ | 342/94 |
| 3,778,829 A | * | 12/1973 | Longuemare et al. .......... | 342/92 |
| 3,810,177 A | * | 5/1974 | Tabourier ..................... | 342/92 |
| 4,115,773 A | * | 9/1978 | Metcalf ........................ | 342/92 |
| 4,228,435 A | * | 10/1980 | Nevin ........................... | 342/91 |
| 4,263,560 A | * | 4/1981 | Ricker ........................... | 342/92 |
| 4,398,196 A | * | 8/1983 | Wiegand ...................... | 342/192 |
| 5,113,192 A | * | 5/1992 | Thomas ........................ | 342/92 |
| 5,293,325 A | * | 3/1994 | Roos ............................ | 342/205 |
| 5,905,459 A | * | 5/1999 | Bunch ........................... | 342/92 |

FOREIGN PATENT DOCUMENTS

JP    06-174826 A    6/1994

\* cited by examiner

*Primary Examiner*—Bernarr E Gregory
(74) *Attorney, Agent, or Firm*—Oliff & Berridge, PLC (57) ABSTRACT

Provided is a pulse radar system capable of measuring the distance to an obstacle with high accuracy irrespective of the distance to an obstacle by securing distance resolution with respect to a reflective wave from an obstacle at a short distance, and preventing a decline in S/N ratio with respect to a reflective wave from an obstacle at a long distance. A pulse radar system includes a transmitting circuit, a transmitting antenna, a receiving antenna, a receiving circuit, and a gain control circuit. The gain control circuit generates a gain control signal corresponding to the amplitude of the reception pulse obtained in response to a gain control transmission pulse wave transmitted from the transmitting circuit, and controls the gain of a reception pulse wave or a reception pulse obtained in response to a measurement transmission pulse wave transmitted from the transmitting circuit after the gain control transmission pulse wave.

3 Claims, 5 Drawing Sheets

PULSE RADAR SYSTEM

BACKGROUND OF THE INVENTION

1. Field of the Invention

The present invention relates to a pulse radar system using a millimeter wave band or a quasi-millimeter wave band, and particularly to a pulse radar system capable of measuring a distance by improving distance resolution or a S/N ratio with respect to a reflective wave from an obstacle at a short distance and a reflective wave from an obstacle at a long distance.

2. Description of the Related Art

There are pulse radar systems detecting the distance to an obstacle by transmitting a pulse wave and receiving the pulse wave reflected from the obstacle in related arts. In the pulse radar systems, a round-trip distance to an obstacle can be found by multiplying the time that elapses from the radiation of a transmission pulse wave to the reception of a reception pulse wave reflected from the obstacle, by light velocity.

Such a pulse radar system measures distances to obstacles at various distances from short distances to long distances; therefore, for the purpose of measuring an obstacle at a short distance, it is necessary to reduce the pulse width of a transmission pulse wave, so a reception system having a wide dynamic range is necessary. Thereby, there is an issue that the pulse radar system becomes complicated, and costs are increased.

In order to overcome the issue, there has been disclosed a technique of applying an AGC (Automatic Gain Control) circuit to the reception system (for example, refer to Japanese Unexamined Patent Application Publication No. H6-174826).

SUMMARY OF THE INVENTION

However, in the case of accurately detecting the positions of obstacles in a wide range from a short distance of a few tens of centimeters to a long distance of a few tens of meters for the purpose of collision avoidance and auto cruising, it is necessary to reduce the pulse width of a transmission pulse wave to approximately 1 ns.

Therefore, in the technique disclosed in Japanese Unexamined Patent Application Publication No. H6-174826, in the case where the gain of a reception pulse wave with a narrow pulse width is controlled by an AGC circuit, feedback time is short. Therefore, a receiving circuit is saturated by the reception pulse wave from an obstacle at a short distance, thereby it is difficult to stably control the gain of the reception pulse wave. Moreover, when the pulse width of a transmission pulse wave is narrow, the energy of a reception pulse wave from an obstacle at a long distance is reduced, so the S/N ratio is reduced to cause measurement error. On the other hand, high distance resolution is necessary specifically between obstacles at short distances, so when the pulse width of the transmission pulse wave is increased, the distance resolution between obstacles at short distances is not sufficiently secured.

In view of the foregoing, it is desirable to provide a pulse radar system capable of measuring the distance to an obstacle with high accuracy irrespective of the distance to the obstacle by securing distance resolution with respect to a reflective wave from an obstacle at a short distance, and preventing a decline in an S/N ratio with respect to a reflective wave from an obstacle at a long distance.

To achieve the above-described pulse radar system, on the basis of a reception pulse obtained by transmitting, receiving and modulating a gain control transmission pulse wave in advance, the gain of a reception pulse wave obtained in response to a measurement transmission pulse wave transmitted after the gain control transmission pulse wave is controlled.

According to an embodiment of the invention, there is provided a pulse radar system including: a transmitting circuit transmitting a transmission pulse wave modulated by a transmission pulse; a transmitting antenna radiating the transmission pulse wave from the transmitting circuit; a receiving antenna receiving a reception pulse wave, the reception pulse wave being radiated from the transmitting antenna as a transmission pulse wave and reflected from an obstacle; a receiving circuit capable of controlling a gain, the receiving circuit demodulating the reception pulse wave from the receiving antenna and outputting a reception pulse; and a gain control circuit generating a gain control signal corresponding to the amplitude of the reception pulse obtained in response to a gain control transmission pulse wave, and controlling, by the gain control signal, the gain of the reception pulse wave or the reception pulse obtained in response to a measurement transmission pulse wave, the gain control transmission pulse wave being transmitted from the transmitting circuit for controlling a gain in the receiving circuit, the measurement transmission pulse wave being transmitted, after the gain control transmission pulse wave, from the transmitting circuit for measuring the distance to the obstacle.

As described above, in the case where the gain of each reception pulse wave is controlled instantaneously, when the pulse width of a transmission pulse wave is narrow, the feedback time is short, and the gain of the reception pulse wave are not sufficiently controlled. Moreover, when the pulse width of the transmission pulse wave is narrow, the energy of the reception pulse wave from an obstacle at a long distance is reduced, so the S/N ratio is reduced to cause measurement error. On the other hand, high distance resolution is necessary specifically between obstacles at short distances, so when the pulse width of the transmission pulse wave is increased, the distance resolution between obstacles at short distances is not sufficiently secured.

Therefore, in the embodiment of the invention, on the basis of the amplitude of a reception pulse obtained by transmitting, receiving and modulating a gain control transmission pulse wave for controlling a gain in the transmitting circuit before the measurement transmission pulse wave for measuring the distance to an obstacle, the gain is controlled in the receiving circuit.

In this case, it can be considered that when the transmission intervals between the transmission pulse waves are short, the moving distance of an obstacle from when a transmission pulse wave is transmitted to when the next transmission pulse wave is transmitted is substantially negligible. Therefore, it is considered that there is no difference between the values of the distance to the obstacle measured by two measurement transmission pulses continuously outputted, so even if either of the values is adopted, no effect is exerted on measurement accuracy.

Thereby, a time difference between the gain control transmission pulse wave and the measurement transmission pulse wave can be provided. Therefore, while the rounds of the reception pulses obtained in response to the gain control transmission pulse waves are completed, the feedback time for controlling the gains of the reception pulse waves obtained in response to the measurement transmission pulses to be outputted later can be secured. Therefore, regarding the reception pulse wave or reception pulse from an obstacle at a short distance, while the saturation in the receiving circuit is prevented, the amplitudes of the reception pulses can be substantially constant. On the other hand, in order to control the gain of the reception pulse wave or the reception pulse from an obstacle at a long distance by the gain control signal generated in advance, the amplitudes of the reception pulses can be substantially constant. Therefore, the gains of the reception pulse waves obtained in response to the measurement transmission pulse waves can be sufficiently controlled, and the amplitudes of the reception pulses can be substantially constant, so the distance to an obstacle can be measured with high accuracy.

In the above-described pulse radar system, it is desirable to transmit the measurement transmission pulse with a wider pulse width to a measurement zone farther from the pulse radar system among a plurality of measurement zones predetermined based on the distance to the obstacle.

In the embodiment of the invention, the pulse width of the measurement transmission pulse wave is increased with distance from the pulse radar system, so in the case of measuring the distance to an obstacle at a short distance, the distance resolution can be increased, and in the case of measuring the distance to an obstacle at a long distance, the S/N ratio of the reception pulse can be increased. Therefore, the distance to an obstacle can be measured irrespective of the distance to the obstacle.

In the above-described pulse radar system, it is desirable that the plurality of measurement zones are determined such that the distance from the pulse radar system to the far end of each of the plurality of the measurement zones configures a geometric series, and the transmitting circuit transmits the measurement transmission pulse wave with a pulse width in proportion to the distance to the far end of each of the plurality of the measurement zones.

In the embodiment of the invention, the distance to the far end of each of the plurality of measurement zone configures a geometric series, so the distance to the obstacle can be measured by geometrically dividing the distance. Moreover, to increase the pulse width of the measurement transmission pulse wave in proportion to the distance to the far end of each zone, the S/N ratio is increased as high as possible in each of the plurality of measurement zones, thereby the distance to the obstacle can be measured. Therefore, the measurement accuracy can be kept substantially uniform irrespective of the distance to an obstacle.

It is desirable that the above-described pulse radar system further includes a decision circuit making a determination of transmitting the measurement transmission pulse wave for the measurement zone to the transmitting circuit, the measurement transmission pulse wave having the same pulse width as the pulse width of the gain control transmission pulse wave, when the decision circuit detects the existence of a plurality of obstacles in any of the plurality of measurement zones on the basis of the reception pulse obtained in response to the gain control transmission pulse wave, and determines that the pulse width of the measurement transmission pulse wave in a measurement zone belonging the plurality of obstacles is equal to or less than the distance resolution between the plurality of obstacles.

In the embodiment of the invention, when the distance resolution is short with a transmission pulse wave with a wide pulse width, the distance to the obstacle is measured by increasing the distance resolution with a transmission pulse wave with a narrow pulse width, so the measurement of the distances to a plurality of obstacles can be maintained.

In the embodiment of the invention, a pulse radar system capable of measuring the distance to an obstacle with high accuracy irrespective of the distance to the obstacle by securing distance resolution with respect to a reflective wave from an obstacle at a short distance, and preventing a decline in an S/N ratio with respect to a reflective wave from an obstacle at a long distance can be provided.

Other and further obstacles, features and advantages of the invention will appear more fully from the following description.

DETAILED DESCRIPTION OF THE PREFERRED EMBODIMENTS

A preferred embodiment will be described in detail below referring to the accompanying drawings. The present invention is not limited to the following embodiment.

Figure 1:
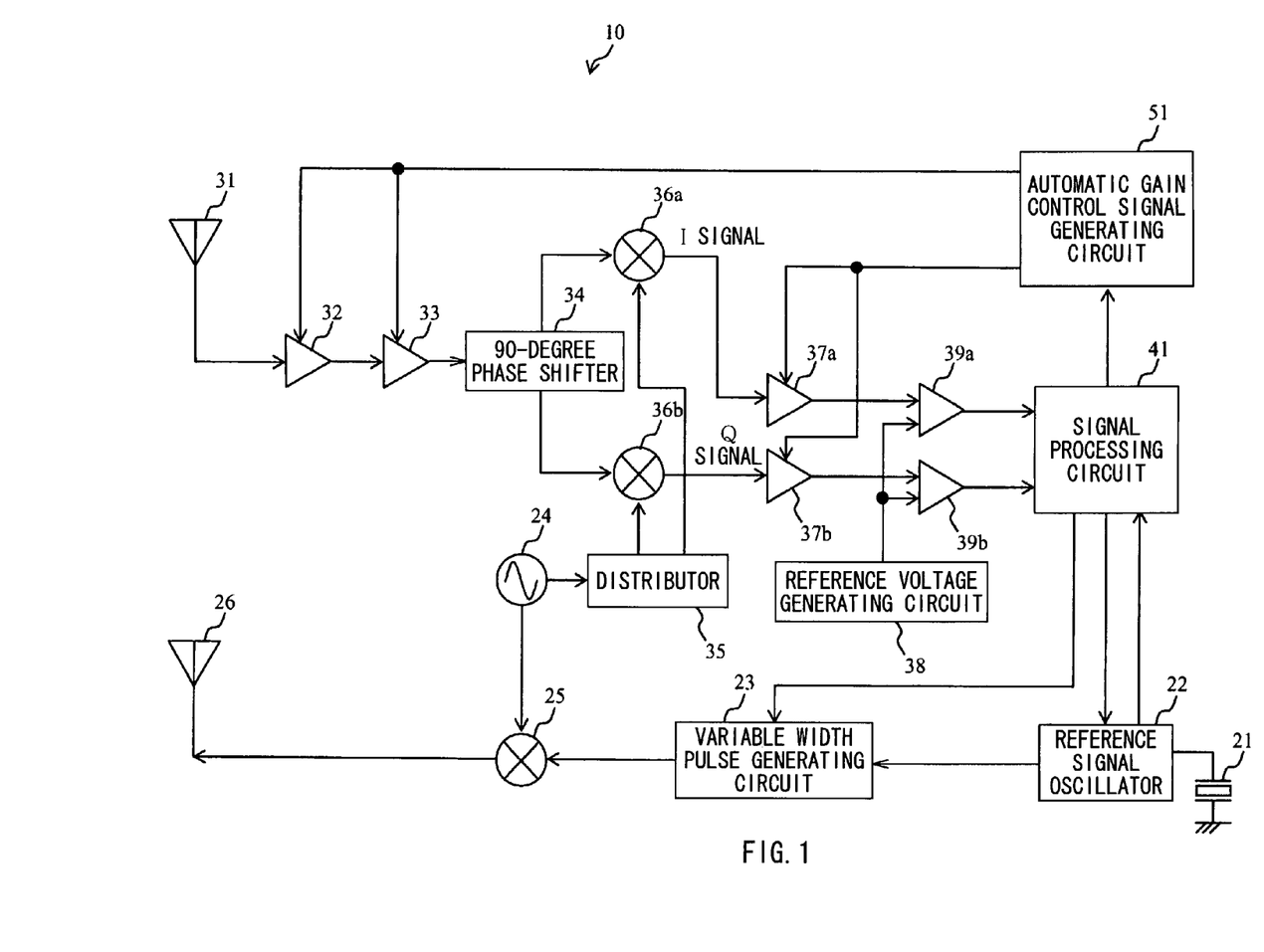
FIG. 1 is a block diagram for describing the configuration of a pulse radar system according to an embodiment of the invention.

FIG. 1 shows a block diagram for describing an example of a pulse radar system according to an embodiment of the invention, and is a block diagram for describing the configuration of the pulse radar system. In FIG. 1, a reference numeral 21 designates an oscillator which outputs an oscillation signal as a reference of the pulse radar system; a reference numeral 22 designates a reference signal oscillator which divides the oscillation signal to generate a reference signal; a reference numeral 23 designates a variable width pulse generating circuit which varies the pulse widths of transmission pulses having a predetermined period generated on the basis of the reference signal and outputs the transmission pulses; a reference numeral 24 designates an oscillator which oscillates at a carrier frequency; a reference numeral 25 designates a modulator which modulates the signal with the carrier frequency by a transmission pulse and outputs a transmission pulse wave; a reference numeral 26 designates a transmitting antenna which radiates the transmission pulse wave; a reference numeral 31 designates a receiving antenna which receives a reception pulse wave from an obstacle; reference numerals 32 and 33 designate radio frequency amplifiers which amplify the reception pulse wave by a predetermined gain and output the reception pulse wave; a reference numeral 34 designates a 90-degree phase shifter which divides the reception pulse wave into waves with a phase difference of 90 degrees to output them; a reference numeral 35 designates a divider which distributes the signal with the carrier frequency between two to output the signal; reference numerals 36a and 36b designate mixers which demodulate the reception pulse wave by the signal with the carrier frequency and output the reception pulse as a reception pulse of an I signal or a Q signal; reference numerals 37a and 37b designate intermediate frequency amplifiers which amplify the reception pulse of the I signal or the Q signal by a predetermined gain and output the reception pulse; a reference numeral 38 designates a reference voltage generating circuit which generates a reference voltage; reference numerals 39a and 39b designates comparators which compare between the reception pulse of the I signal or the Q signal and the reference voltage and output the reception pulse; a reference numeral 41 designates a signal processing circuit which stores the reception pulse and calculates a distance to an obstacle on the basis of the reception pulse and the reference signal; and a reference numeral 51 designates an automatic gain control signal generating circuit which generates a gain control signal on the basis of the reception pulse. In addition, the obstacle includes any obstacle reflecting the transmission pulse wave from the transmitting antenna 26, and is not shown in FIG. 1.

The oscillator 21, the reference signal oscillator 22, the variable width pulse generating circuit 23, the oscillator 24 and the modulator 25 are included in a transmitting circuit. Moreover, the oscillator 24, the radio frequency amplifier 32, the radio frequency amplifier 33, the 90-degree phase shifter 34, the divider 35, the mixers 36*a* and 36*b*, the intermediate frequency amplifiers 37*a* and 37*b*, the reference voltage generating circuit 38 and the comparators 39*a* and 39*b* are included in a receiving circuit. Further, the automatic gain control signal generating circuit 51 is included in a gain control circuit. The signal processing circuit 41 includes a decision circuit.

At first, the configuration of a transmission system of the pulse radar system 10 will be described with reference to FIG. 1. The variable width pulse generating circuit 23 generates transmission pulses with a predetermined pulse width on the basis of a reference signal from the reference signal oscillator 22. The intervals of transmission pulse generation may be periodic or a periodic; however, it is preferable that the intervals are set to be longer than the round-trip wave propagation time corresponding to the maximum detection distance of the pulse radar system 10. In the embodiment, when the reference signal from the reference signal oscillator 22 is inputted into the variable width pulse generating circuit 23, the variable width pulse generating circuit 23 changes the pulse width of the reference signal, and then outputs the reference signal as a transmission pulse. Thereby, the pulse width of a transmission pulse wave outputted from the modulator 25 is determined. The pulse width of the transmission pulse outputted from the variable width pulse generating circuit 23 is preferably within a range from 1 ns to 100 ns inclusive. The distance to a measured obstacle detected by the pulse radar system 10 is approximately from 15 cm to 15 m, and the distance corresponds to from 1 ns to 100 ns in the pulse width of the transmission pulse which determines resolution. The setting of the pulse width will be described in detail later.

The modulator 25 modulates a signal with the carrier frequency from the oscillator 24 by the transmission pulse from the variable width pulse generating circuit 23, and outputs a transmission pulse wave. The transmitting antenna 26 radiates the transmission pulse wave from the modulator 25. The transmitting antenna 26 may be made up of a plurality of antennas.

Next, the configuration of a reception system of the pulse radar system 10 will be described with reference to FIG. 1. The receiving antenna 31 receives a reception pulse wave reflected from an obstacle. Like the transmitting antenna 26, the receiving antenna 31 may also be made up of a plurality of antennas. Alternatively, a transmitter-receiver antenna may be used. The radio frequency amplifiers 32 and 33 amplify the reception pulse wave by a predetermined gain on the basis of a gain control signal generated in the automatic gain control signal generating circuit 51 which will be described later, and then output the reception pulse wave.

The mixer 36*a* demodulates a reception pulse wave from the 90-degree phase shifter 34, and then outputs a reception pulse as an I signal. As demodulation, for example, a detection mode which can be achieved by a usual technique of synchronous detection or asynchronous detection such as envelope demodulation can be used. In the embodiment, the oscillator 24 generates a local signal in a frequency band used in the pulse radar system 10, and synchronous detection is performed on the basis of the generated local signal. The intermediate frequency amplifier 37*a* amplifies the reception pulse from the mixer 36*a* by a predetermined gain on the basis of the gain control signal generated in the automatic gain control signal generating circuit 51 which will be described later, and then outputs the reception pulse. On the other hand, the mixer 36*b* demodulates a reception pulse wave from the 90-degree phase shifter 34, and outputs a reception pulse as a Q signal. Moreover, the intermediate frequency amplifier 37*b* amplifies the reception pulse from the mixer 36*b* by a predetermined gain on the basis of the gain control signal generated in the automatic gain control signal generating circuit 51 which will be described later, and then outputs the reception pulse.

The signal processing circuit 41 acquires the reception pulses which are compared with the reference voltage in the comparators 39*a* and 39*b* and then are outputted to store the amplitudes and the output timings of the reception pulses, and the signal processing circuit 41 acquires the reference signal from the reference signal oscillator 22 to store the output timing of the reference signal. Thereby, the time from when the transmission pulse wave is outputted from the modulator 25 as a transmitting circuit to when the reception pulse is outputted from the comparators 29*a* and 29*b* as receiving circuits can be calculated, so in consideration of a delay time by signal processing from the modulator 25 to the comparators 39*a* and 39*b*, the distance to the obstacle can be determined by calculating the time from when the transmission pulse wave is radiated from the transmitting antenna 26, and then is reflected from the obstacle to when the transmission pulse wave is returned to the receiving antenna 31. Moreover, the signal processing circuit 41 can also make various decisions which will be described later on the basis of the stored reception pulse.

The automatic gain control signal generating circuit 51 generates and outputs a gain control signal for controlling the gain of a reception pulse wave or a reception pulse in the radio frequency amplifiers 32 and 33 and the intermediate frequency amplifiers 37*a* and 37*b* on the basis of the amplitude of the reception pulse stored in the signal processing circuit 41.

Now, with reference to FIG. 1 and timing charts which will be described later, the signal processing operation in the pulse radar system 10 will be described below.

Figure 2:
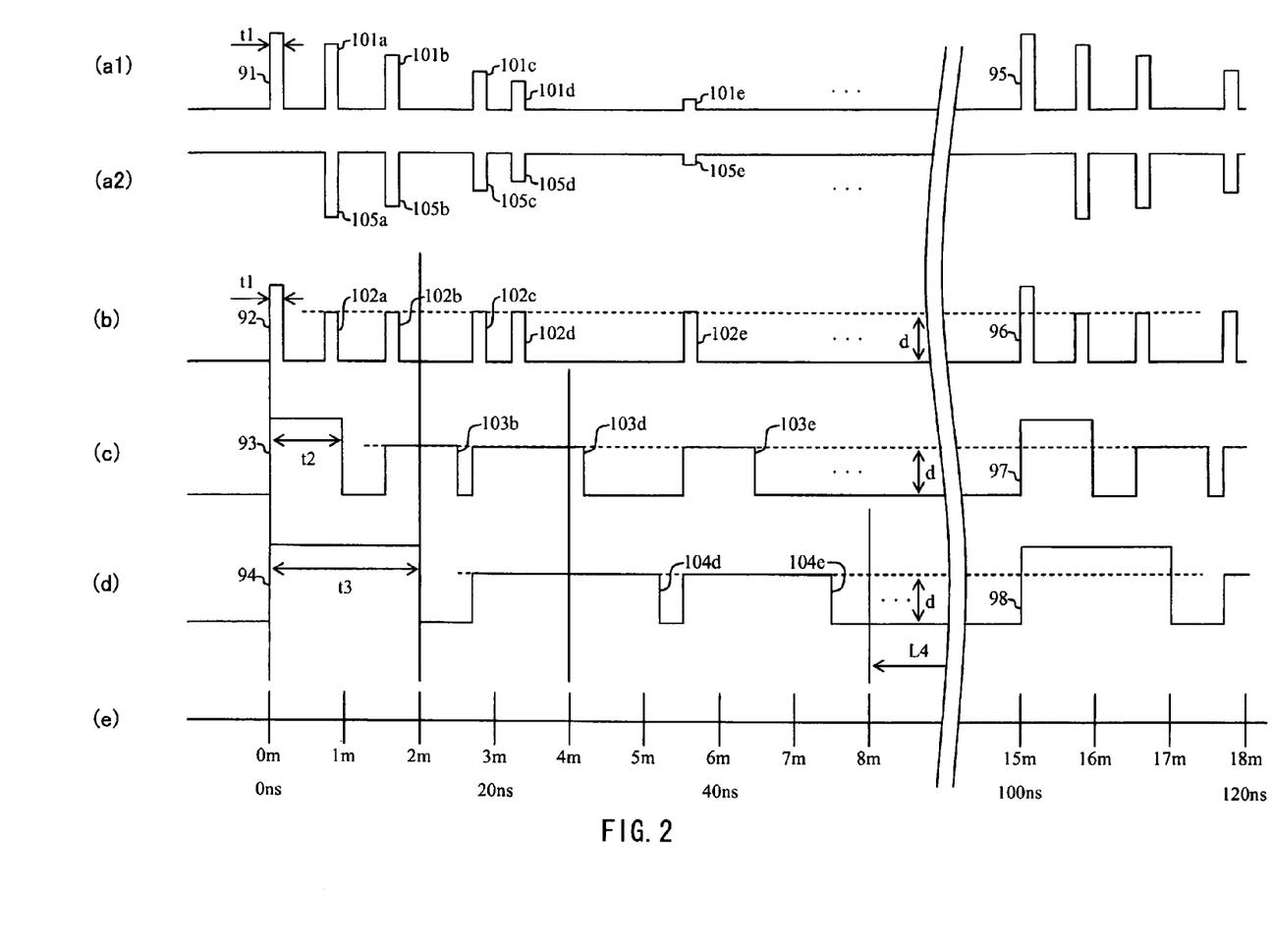
FIG. 2 is an example of timing charts including the timings of a transmission pulse and a reception pulse processed by the pulse radar system.

FIG. 2 is an example of timing charts including the timings of a transmission pulse and a reception pulse processed in the pulse radar system. FIG.2(*a*) shows the timing of a reception pulse obtained in response to a gain control transmission pulse in the first round; FIG. 2(*a*') shows the timing of a gain control signal based on the reception pulse in the first round; FIG. 2(*b*) shows the timing of a reception pulse obtained in response to a measurement transmission pulse in the second round; and FIG. 2(*c*) shows the timing of a reception pulse obtained in response to a measurement transmission pulse in the third round; and FIG. 2(*d*) shows the timing of a reception pulse obtained in response to a measurement transmission pulse in the fourth round; and FIG. 2(*e*) shows measurement distances to obstacles corresponding to the time base of the timings of pulses. The forward direction of the time base is toward the right in the drawing.

FIGS. 2(*a*), 2(*b*), 2(*c*) and 2(*d*) show the output timings of a plurality of reception pulses outputted from the comparators 39*a* and 39*b* after outputting a plurality of transmission pulses from the variable width pulse generating circuit 23 shown in FIG. 1 at regular generation intervals (every 100 ns in FIGS. 2(a) through 2(d)).

When a gain control transmission pulse 91 shown in FIG. 2(a) is outputted from the variable width pulse generating circuit 23, the gain control transmission pulse 91 is modulated by the modulator 25, and is outputted from the transmitting antenna 26 as a gain control transmission pulse wave. Then, after reception pulse waves reflected from obstacles are received by the receiving antenna 31, and demodulated by the mixers 36a and 36b, the reception pulse waves are outputted from the comparators 39a and 39b as reception pulses 101a, 101b, 101c, 101d and 101e (hereinafter a relationship corresponding to the gain control transmission pulse 91 and the reception pulses 101a, 101b, 101c, 101d and 101e is referred to as "a reception pulse obtained in response to a transmission pulse"). In FIG. 2(a), there are a plurality of reception pulses like the reception pulses 101a, 101b, 101c, 101d and 101e, because the pulse radar system 10 receives reception pulse waves from a plurality of obstacles at different distances according to the round-trip wave propagation time of the gain control transmission pulse. The same applies to the cases where measurement transmission pulses 92, 93 and 94 as the bases of measurement transmission pulse waves are outputted in FIGS. 2(b), 2(c) and 2(d). Moreover, FIG. 2(a) shows a state in which as energy at the time of receiving a reception pulse becomes smaller with distance from the pulse radar system 10 to an obstacle, the amplitudes of the reception pulses 101a, 101b, 101c, 101d and 101e become smaller. The amplitude of the reception pulse is susceptible to not only the distance to an obstacle but also the material or the angle of a reflecting surface, so the time series of amplitudes is not limited to the time series shown in FIGS. 2(a) through 2(e).

In the embodiment, in order to improve distance resolution with respect to the measurement distance to an obstacle, the pulse width t1 of the gain control transmission pulse 91 is set to be approximately 1 ns to 2 ns. For example, when the pulse width t1 is set to be 1 ns, providing that the distance between the pulse radar system 10 and the obstacle is x, and the speed of a radio wave is c (c=3.0×10$^8$ m/s), the pulse radar system 10 can measure a distance of approximately 15 cm as a minimum measurement distance x.

In this case, when the gains of the reception pulse waves or the reception pulses as the bases of the reception pulses 101a, 101b, 101c, 101d and 101e are controlled instantaneously, the pulse width of the gain control transmission pulse 91 is narrow as described above, so the feedback time is short, and the gains of the reception pulse waves are not sufficiently controlled. Moreover, when the pulse width of the gain control transmission pulse 91 is narrow, the energy of a reception pulse wave from an obstacle at a long distance is reduced; therefore, for example, the S/N ratio of the reception pulse 101e is reduced to cause an error in the measurement distance calculated on the basis of the reception pulse 101e. On the other hand, high distance resolution is necessary specifically between obstacles at short distances, so when the pulse width of the gain control transmission pulse 91 as the base of the gain control transmission pulse wave is larger than the pulse width t1, the distance resolution between obstacles at short distances is not sufficiently secured.

Therefore, in the embodiment, in the pulse radar system 10, the gain control transmission pulse 91 shown in FIG. 2(a) as the base of the gain control transmission pulse wave is outputted from the variable width pulse generating circuit 23 in advance, and a gain control signal corresponding to the amplitude of the reception pulse obtained according to the round-trip wave propagation time of the gain control transmission pulse 91 by the gain control transmission pulse 91 is generated in the automatic gain control signal generating circuit 51. After that, measurement transmission pulse waves based on the measurement transmission pulses 92, 93 and 94 shown in FIGS. 2(b) through 2(d) are outputted from the variable width pulse generating circuit 23, and the gains of reception pulse waves obtained in response to the measurement transmission pulses 92, 93 and 94 are controlled by the gain control signal from the automatic gain control signal generating circuit 51 according to the round-trip wave propagation time of the measurement transmission pulse waves based on the measurement transmission pulses 92, 93 and 94.

More specifically, the automatic gain control signal generating circuit 51 generates gain control signals 105a, 105b, 105c, 105d and 105e shown in FIG. 2(a') by inverting the reception pulses 101a, 101b, 101c, 101d and 101e shown in FIG. 2(a) stored in the signal processing circuit 41, and outputs them. The gain control signals 105a, 105b, 105c, 105d and 105e are inputted into the radio frequency amplifiers 32 and 33 and the intermediate frequency amplifiers 37a and 37b. In the radio frequency amplifiers 32 and 33, on the basis of the gain control signals 105a, 105b, 105c, 105d and 105e, a reception pulse wave obtained in response to the measurement transmission pulse 92 outputted in the second round shown in FIG. 2(b) is amplified according to the round-trip wave propagation time of the measurement transmission pulse wave based on the measurement transmission pulse 92. Moreover, in the intermediate frequency amplifiers 37a and 37b, on the basis of the gain control signals 105a, 105b, 105c, 105d and 105e, a reception pulses obtained in response to the measurement transmission pulse 92 outputted in the second round is amplified according to the round-trip wave propagation time of the measurement transmission pulse wave based on the measurement transmission pulse 92. Thus, when the gains of reception pulse waves or reception pulses as the bases of reception pulses 102a, 102b, 102c, 102d and 102e are controlled by the gain control signals 105a, 105b, 105c, 105d and 105e, the amplitudes of the reception pulses 102a, 102b, 102c, 102d and 102e can be kept constant at an amplitude d. In other words, among the reception pulses 102a, 102b, 102c, 102d and 102e, for example, the amplification factor of a reception pulse wave or a reception pulse with a large amplitude as the base of the reception pulse 102a is decreased, and the amplification factor of a reception pulse wave or a reception pulse with a small amplitude as the base of the reception pulse 102e is increased compared to the case of the reception pulse 102a.

In the radio frequency amplifiers 32 and 33 and the intermediate frequency amplifiers 37a and 37b, the above-described amplification process is performed on reception pulse waves or reception pulses which are the bases of reception pulses 103b, 103d and 103e obtained in response to the measurement transmission pulse 93 outputted in the third round shown in FIG. 2(c), and reception pulses 104d and 104e obtained in response to the measurement transmission pulse 94 outputted in the fourth round shown in FIG. 2(d). The pulse width t2 of the measurement transmission pulse 93 in the third round and the pulse width t3 of the measurement transmission pulse 94 in the fourth round are larger than the pulse width t1 of the measurement transmission pulse 92 in the second round, so the pulse widths of reception pulses obtained in response to the measurement transmission pulses 93 and 94 are increased. Therefore, in the radio frequency amplifiers 32 and 33 and the intermediate frequency amplifiers 37a and 37b, control of the gains of the reception pulse waves or the reception pulses is performed during a period equivalent to the pulse widths t2 and t3 of the measurement transmission pulses 93 and 94 on the basis of the gain control signals 105a, 105b, 105c, 105d and 105e. In the embodiment, all of the radio frequency amplifiers 32 and 33 and the intermediate frequency amplifiers 37a and 37b perform gain control; however, the gains of the reception pulse waves or the reception pulses may be controlled by any one or a combination of the radio frequency amplifiers 32 and 33 and the intermediate frequency amplifiers 37a and 37b.

Thus, the automatic gain control signal generating circuit 51 controls the gains of the reception pulse waves or the reception pulse in the radio frequency amplifiers 32 and 33 and the intermediate frequency amplifiers 37a and 37b, so the pulse radar system 10 can keep the amplitudes of reception pulses outputted from the comparators 39a and 39b substantially constant at the amplitude d by the measurement transmission pulse 92 in the second round, the measurement transmission pulse 93 in the third round and the measurement transmission pulse 94 in the fourth round which are outputted after the gain control transmission pulse 91 in the first round, and then output the reception pulses.

For example, in the case where the distance to an obstacle at a distance of a few tens of meters from the pulse radar system 10 is measured as shown in FIG. 2(e), the transmission intervals of the gain control transmission pulse waves and the measurement transmission pulses can be set to be very short, 100 ns to 1 μs. Therefore, when the transmission intervals are short in such a manner, it can be considered that the amount of change in a relative distance to an obstacle from when the measurement transmission pulse 92 as the base of the measurement transmission pulse wave is outputted to when the measurement transmission pulse 96 as the base of the next gain control transmission pulse wave is outputted is substantially negligible. Therefore, it is considered that there is little difference between the values of the distance to the obstacle measured by two measurement transmission pulses 92 and 96 continuously outputted, so even if either of the values is adopted as a measurement distance, no effect is exerted on measurement accuracy. Therefore, the gain control transmission pulse as the base of the gain control transmission pulse wave may be outputted only once, or a plurality of times like the gain control transmission pulses 91 and 95 as shown in FIG. 2(a). In the case where the gain control transmission pulse is outputted only once, the automatic gain control signal generating circuit 51 can perform gain control in a short time. On the other hand, in the case where the gain control transmission pulse is outputted a plurality of times, the automatic gain control signal generating circuit 51 can stabilize gain control by averaging the amplitude values of reception pulses obtained in response to the gain control transmission pulses in the rounds to generate a gain control signal. Further, the measurement transmission pulses 92, 93 and 94 shown in FIGS. 2(b), 2(c) and 2(d) may be outputted only once or a plurality of times in each transmission round.

Thus, the automatic gain control signal generating circuit 51 outputs the gain control transmission pulse 91 as the base of the gain control transmission pulse wave in advance before the measurement of the distance to the obstacle to generate the gain control signals 105a, 105b, 105c, 105d and 105e, thereby the pulse radar system 10 can provide a time difference between the gain control transmission pulse 91 and the measurement transmission pulses 92, 93 and 94 as the bases of the measurement transmission pulse waves. Therefore, while the rounds of the reception pulses 101a, 101b, 101c, 101d and 101e obtained in response to the gain control transmission pulse wave are completed, the feedback time for controlling the gains of the reception pulse waves obtained in response to the measurement transmission pulses 92, 93 and 94 as the bases of the measurement transmission pulse waves to be outputted later in the second, third and fourth rounds can be secured. Therefore, regarding the reception pulse wave or the reception pulse from an obstacle at a short distance, while the saturation of output from the radio frequency amplifiers 32 and 33 and the intermediate frequency amplifiers 37a and 37b in the receiving circuit is prevented, the amplitudes of the reception pulses from the comparators 39a and 39b can be substantially constant. On the other hand, in order to control the gain of the reception pulse wave or the reception pulse from an obstacle at a long distance by the gain control signal generated in advance, the amplitudes of the reception pulses from the comparators 39a and 39b can be substantially constant. Therefore, the gains of the reception pulse waves obtained in response to the measurement transmission pulse waves based on the measurement transmission pulses outputted in the second, third and fourth rounds can be sufficiently controlled, and the amplitudes of the reception pulses can be substantially constant, so the distance to an obstacle can be measured with high accuracy.

Moreover, in the embodiment, as shown in FIGS. 2(c) and 2(d), the pulse width t2 of the measurement transmission pulse 93 in the third round, the pulse width t3 of the measurement transmission pulse 94 in the fourth round are set to be larger than the pulse width t1 of the measurement transmission pulse 92 in the second round. As will be described below, it depends on a measurement zone determined according to the distance from the pulse radar system 10 to an obstacle.

Figure 3:
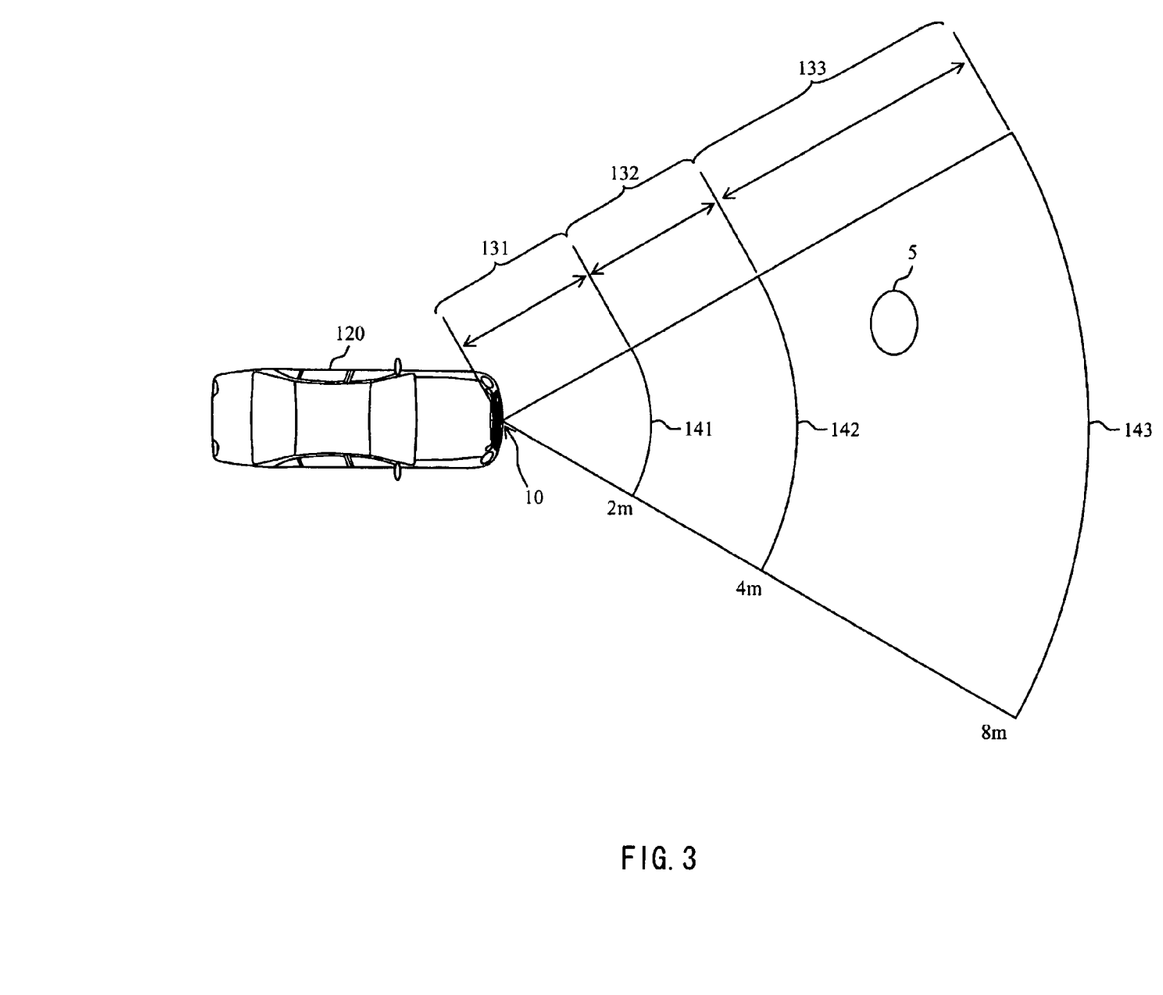
FIG. 3 is a schematic view of an example of an vehicle and a measurement range of a pulse radar system mounted on the vehicle.

FIG. 3 is a schematic view showing an example of a vehicle and the measurement range of a pulse radar system mounted on the vehicle. In FIG. 3, a reference numeral 120 designates a vehicle, and reference numerals 131 to 134 designate measurement zones. In FIG. 3, the pulse radar system 10 is placed in a bumper in front of the vehicle. The pulse radar system 10 may be placed in any position of the vehicle 120 depending on an obstacle detecting direction.

In the embodiment, the ranges of 0 m to 2 m, 2 m to 4 m and 4 m to 8 m from the vehicle 120 are determined as measurement zones. The measurement zone means a zone in which, for example, when an obstacle 5 exists in a measurement zone 133, only the obstacle 5 is detected and even if an obstacle exists in other measurement zones 131 and 132, the obstacle is not detected. The measurement zone is uniquely set by the pulse radar system 10 in advance. The variable width pulse generating circuit 23 shown in FIG. 1 outputs the measurement transmission pulses 92, 93 and 94 of which the pulse widths t1, t2 and t3 are gradually increased as shown in FIGS. 2(b), 2(c) and 2(d) to a plurality of measurement zones 131, 132 and 133 predetermined according to the distance to the obstacle measured by the pulse radar system 10 in order of increasing distance from the pulse radar system 10.

Moreover, as shown in FIG. 3, in the case where the distances from the pulse radar system 10 to the far ends 141, 142 and 143 of the plurality of measurement zones 131, 132 and 133 configure a geometric series, the variable width pulse generating circuit 23 shown in FIG. 1 outputs a measurement transmission pulse with a pulse width in proportion to the distances to the far ends 141, 142 and 143 of the zones. In FIG. 2(d), the pulse width t3 of the measurement transmission pulse 94 is twice as large as the pulse width t2 of the measurement transmission pulse 93 shown in FIG. 2(c). In this case, even in the case where measurement zones are set so that the distances to the far ends of the measurement zones in a range where the distances to the far ends in FIG. 3 is equal to or longer than 8 m are 16 m, 32 m and 64 m, the pulse width of a measurement transmission pulse is increased to be proportional to the geometric series of the distance according to the distance to the far end of each zone, that is, 4 times, 8 times and 16 times as large as the pulse width t2 of the measurement transmission pulse 93.

Now, in FIG. 2(b), when the distance to an obstacle is measured in the case where the measurement zone is 0 m to 2 m, the signal processing circuit 41 shown in FIG. 1 processes only the reception pulses 102a and 102d shown in FIG. 2(b), and does not process other reception pulses 102c, 102d and 102e. In FIG. 2(c), when the distance to an obstacle is measured in the case where the measurement zone is 2 m to 4 m, the signal processing circuit 41 processes only the reception pulse 103d shown in FIG. 2(c), and does not process other reception pulses 103b and 103e. Moreover, in FIG. 2(d), when the distance to an obstacle is measured in the case where the measurement zone is 4 m to 8 m, the signal processing circuit 41 processes only the reception pulse 104e shown in FIG. 2(d), and does not process the other reception pulse 104d.

Thus, when the pulse widths of the measurement transmission pulses 92, 93 and 94 as the bases of measurement transmission pulse waves are increased to the pulse widths t1, t2 and t3 (refer to FIGS. 2(a) through 2(e)) with distance to the far ends 141, 142 and 143 of the measurement zones 131, 132 and 133 shown in FIG. 3, in the case of measuring the distance to an obstacle at a short distance, the distance resolution can be higher, and in the case of measuring the distance to an obstacle at a long distance, the S/N ratio of the reception pulse can be higher. Therefore, the pulse radar system 10 can measure the distance to an obstacle irrespective of the distance to an obstacle.

Moreover, when the distances to the far ends 141, 142 and 143 of the measurement zones 131, 132 and 133 shown in FIG. 3 configure a geometric series, the distance to an obstacle can be measured by geometrically dividing the distance. Further, as shown in FIGS. 2(c) and 2(d), the pulse widths t2 and t3 of the measurement transmission pulses 93 and 94 as the bases of the measurement transmission pulse waves are increased in proportion to the distance to the far ends 142 and 143 of the zones, so the distance to an obstacle can be measured by increasing the S/N ratio as high as possible in each zone of the measurement zones 132 and 133. Therefore, the pulse radar system 10 can keep the measurement accuracy substantially constant irrespective of the distance to an obstacle.

In this case, it can be considered that there is a difference in the S/N ratio between the reception pulse obtained in response to the measurement transmission pulse 92 in the second round shown in FIG. 2(d) and the reception pulse obtained in response to the measurement transmission pulse 94 in the fourth round shown in FIG. 2(d). In this case, it can be assumed that it is difficult to sufficiently control the gains of the reception pulse waves or the reception pulses obtained in response to the measurement transmission pulses 92 and 93 with the gain control signals 105a to 105e generated by the gain control transmission pulse 91 in the first round. In this case, a gain control signal may be generated by outputting a gain control transmission pulse with a pulse width according to the pulse width of the measurement transmission pulse wave. Thereby, the distance to an obstacle at a longer distance can be measured.

Moreover, in the case of FIG. 2(c), it is found that the reception pulse 103d including overlapping reception pulses corresponding to the reception pulses 102c and 102d shown in FIG. 2(b) is outputted. It is because two obstacles exist in the measurement zone of 2 m to 4 m, and the distance between two obstacles is equal to or less than the distance resolution with the pulse width t2 of the measurement transmission pulse 93. In this case, two obstacles can be detected by the pulse width t1 of the gain control transmission pulse 91, so the signal processing circuit 41 shown in FIG. 1 detects the existence of a plurality of obstacles in any of the measurement zones 131, 132 and 133 on the basis of the gain control transmission pulse 91 (in FIG. 2(a), the existence of two obstacles in each of the measurement zones of 0 m to 2 m and 2 m to 4 m is detected), and when it is determined that the distance between the plurality of obstacles is equal to or less than the distance resolution with the pulse width of a measurement transmission pulse as the base of a measurement transmission pulse wave in a measurement zone belonging to the plurality of obstacles (it is determined that with the pulse width t2 of the measurement transmission pulse 92 shown in FIG. 2(c), the distance between two obstacles in the measurement zone of 2 m to 4 m is equal to or less than the distance resolution), a result signal is outputted toward the variable width pulse generating circuit 23 and the reference signal oscillator 22. By the acquisition of the result signal, the reference signal oscillator 22 outputs a reference signal, and the variable width pulse generating circuit 23 changes the reference signal from the reference signal oscillator 22 into a transmission pulse with the same pulse width as the pulse width t1 of the gain control transmission pulse 91, and then outputs the transmission pulse. The signal processing circuit 41 can output a transmission pulse with the same pulse width as the pulse width t1 of the gain control transmission pulse 91 to the variable width pulse generating circuit 23 by the output of the result signal. Then, the signal processing circuit 41 calculates the distances to the plurality of obstacles on the basis of the time from when a transmission pulse wave based on the transmission pulse from the variable width pulse generating circuit 23 is outputted from the modulator 25 to when reception pulses obtained in response to the outputted transmission pulse wave are outputted from the comparators 39a and 39b. The adequacy of the distance resolution between the plurality of obstacles can be determined by storing the pulse width of the measurement transmission pulse outputted from the variable width pulse generation circuit 23 by the signal processing circuit 41 in advance, and comparing the transmission intervals of the reception pulses 101a, 101b, 101c, 101d and 101e shown in FIG. 2(a) and stored later and the pulse width of a measurement transmission pulse corresponding to each measurement zone.

Next, with reference to FIGS. 1 and FIGS. 2(a) through 2(e) and an operation flow which will be described later, steps of measuring the distance to an obstacle will be described below.

Figure 4A:
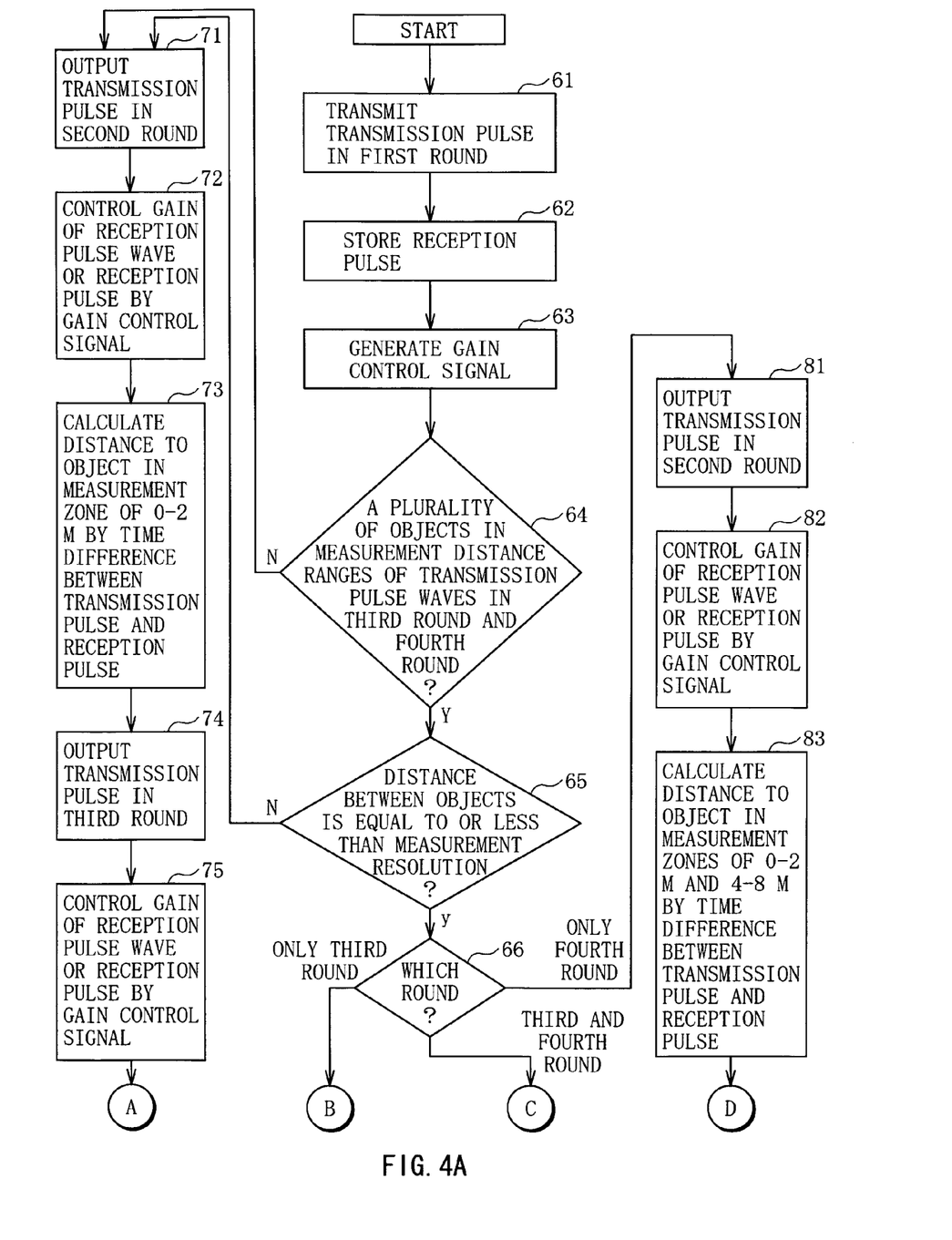
FIGS. 4A and 4B are an example of the operation flow of the pulse radar system.
Figure 4B:
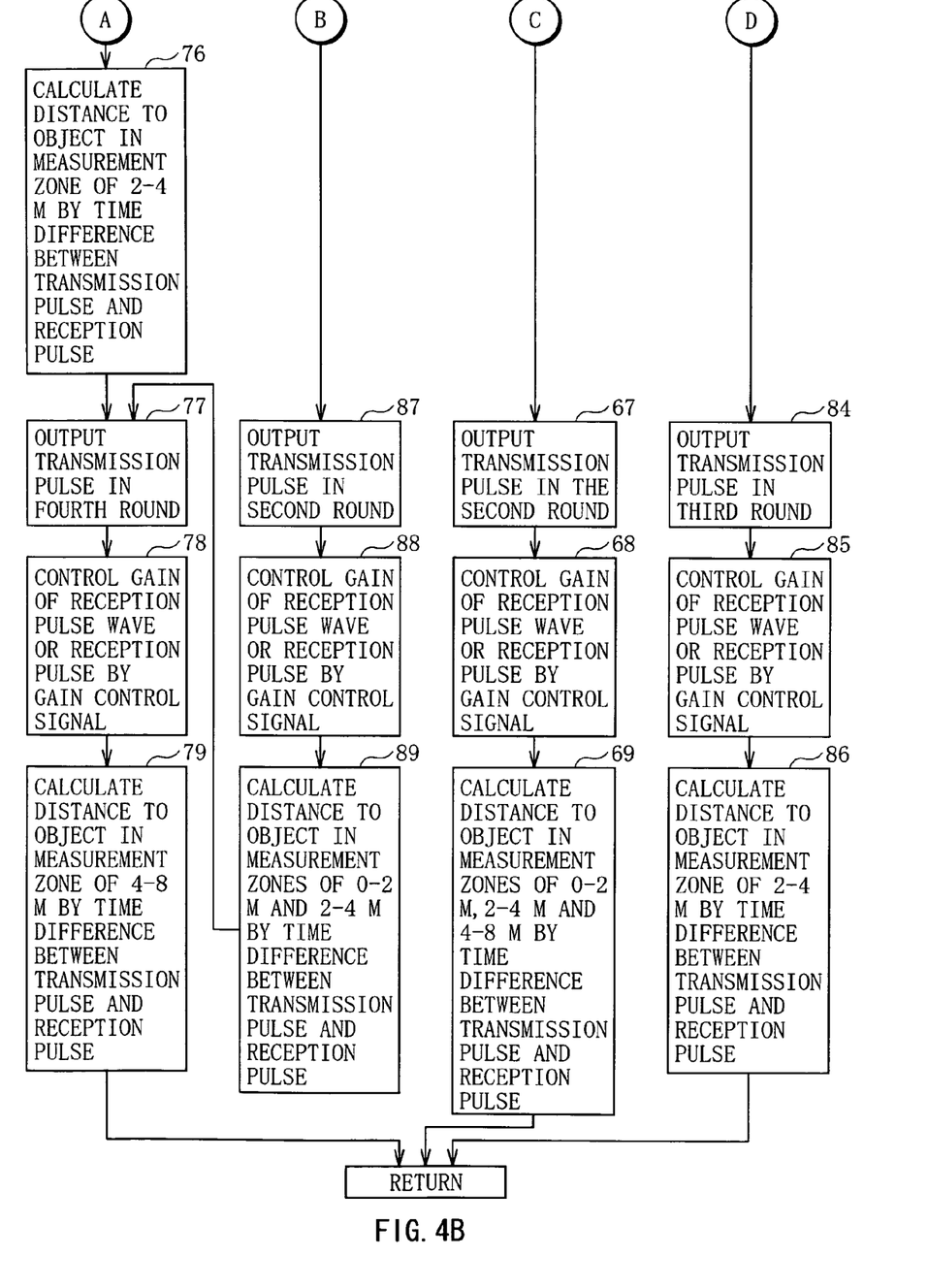

FIGS. 4A and 4B are illustrations showing an example of the operation flow of a pulse radar system. In FIGS. 4A and 4B, reference numerals 61 through 69, 71 through 79 and 81 through 89 designate steps.

At first, in the step 61, the variable width pulse generating circuit 23 outputs the gain control transmission pulse 91 in the first round shown in FIG. 2(a). The gain control transmission pulse 91 from the variable width pulse generating circuit 23 modulates a signal with a carrier frequency from the oscillator 24 in the modulator 25, and is radiated from the transmitting antenna 26 as a gain control transmission pulse wave. After that, the gain control transmission pulse wave is reflected from an obstacle, and then is received by the receiving antenna 31 as a reception pulse wave. The reception pulse wave from the receiving antenna 31 is divided into waves with a phase difference of 90 degrees by the 90-degree phase shifter 34 via the radio frequency amplifiers 32 and 33, and the waves are demodulated in the mixers 36a and 36b, and are outputted as reception pulses. The reception pulses from the mixers 36a and 36b are compared with a reference voltage in the comparators 39a and 39b via the intermediate frequency amplifiers 37a and 37b, and the reception pulses are outputted to the signal processing circuit 41 according to a difference between the reception pulses and the reference voltage. Then, in the step 62, the signal processing circuit 41 acquires the reception pulses 101a, 101b, 101c, 101d and 101e in FIG. 2(a) obtained corresponding to the round-trip wave propagation time of the gain control transmission pulse wave, and stores the reception timings and amplitudes of the reception pulses 101a, 101b, 101c, 101d and 101e.

Next, in the step 63, the automatic gain control signal generating circuit 51 generates the gain control signals 105a, 105b, 105c, 105d and 105d by inverting the reception pulses 101a, 101b, 101c, 101d and 101e on the basis of the amplitudes of the reception pulses 101a, 101b, 101c, 101d and 101e stored in the signal processing circuit 41, and outputs them.

Next, in the step 64, the signal processing circuit 41 determines from the reception intervals of the reception pulses 101a, 101b, 101c, 101d and 101e whether a plurality of obstacles exist or not in the measurement distance ranges of the measurement transmission pulses as the bases of the measurement transmission pulse waves in the second, third and fourth round shown in FIGS. 2(a) through 2(e). In the embodiment, the reception pulses 101a and 101b exist in the measurement zone of 0 m to 2 m, and the reception pulse 101c and 101d exist in the measurement zone of 2 m to 4 m, so it is determined that there are two obstacles in each zone. In this case, in FIGS. 4A and 4B, the procedure goes to the next step 65. On the other hand, when a plurality of obstacles are not detected in any measurement zone in the step 64, the procedure goes to the step 71. In the embodiment, the procedure goes to the step 65, so the flow from the step 71 will be described later.

Next, in the step 65, the signal processing circuit 41 compares the reception intervals of the reception pulses 101a, 101b, 101c, 101d and 101e shown in FIG. 2(a) and the pulse widths t2 and t3 of the measurement transmission pulses 93 and 94 corresponding to each measurement zone, and the pulse widths t2 and t3 of the measurement transmission pulses 93 and 94 outputted in the third round and the fourth round shown in FIGS. 2(b) and 2(c) from the variable width pulse generating circuit 23 determine whether the distance between the plurality of obstacles in the measurement zone belonging to the obstacles is equal to or less than the distance resolution. In the embodiment, the width between the reception pulses 101c and 101d in the measurement zone of 2 m to 4 m is equal to or less than the pulse width t2 of the measurement transmission pulse 93, so the pulse width t2 of the measurement transmission pulse 93 is equal to or less than the distance resolution. Therefore, it is determined that the distance between the obstacles is equal to or less than the distance resolution, so the procedure goes to the step 66. On the other hand, in the case where it is determined that the distance between the obstacles in any of the measurement zones is larger than the distance resolution, the procedure goes to the step 71. In the embodiment, the procedure goes to the step 66, so the flow from the step 71 will be described later.

Next, in the step 66, the signal processing circuit 41 determines which round of the pulse width of the measurement transmission pulse outputted is equal to or less than the distance resolution, and then the signal processing circuit 41 determines which step the procedure goes to. In the embodiment, as described above, the pulse width t2 of the measurement transmission pulse 93 for the reception pulses 101c and 101d in the measurement zone of 2 m to 4 m is equal to or less than the distance resolution, so the procedure goes to the step 87. On the other hand, in the case where the pulse width t3 of the measurement transmission pulse 94 only in the fourth round is equal to or less than the distance resolution, the procedure goes to the step 81, and in the case where the pulse widths t2 and t3 of the measurement transmission pulses 93 and 94 in the third round and fourth round are equal to or less than the distance resolution, the procedure goes to the step 67. In the embodiment, the procedure goes to the step 87, so the flow from the step 67 and the flow from the step 81 will be described later.

Next, in the step 87, the variable width pulse generating circuit 23 outputs the measurement transmission pulse 92 as the base of the measurement transmission pulse wave in the second round shown in FIG. 2(b). Then, in the step 88, the radio frequency amplifiers 32 and 33 and the intermediate frequency amplifiers 37a and 37b control the gains of the reception pulse waves or the reception pulses obtained in response to the measurement transmission pulse 92 on the basis of the gain control signals 105a, 105b, 105c, 105d and 105e from the automatic gain control signal generating circuit 51, and outputs the reception pulse waves or the reception pulses with a constant amplitude d. In the step 89, the signal processing circuit 41 calculates the distance to an obstacle in the measurement zones of 0 m to 2 m and 2 m to 4 m by a time difference between the measurement transmission pulse 92 and the reception pulses 102a, 102b, 102c and 102d obtained in response to the measurement transmission pulse 92.

Next, in the step 77, the variable width pulse generating circuit 23 outputs the measurement transmission pulse 94 as the base of the measurement transmission pulse wave in the fourth round shown in FIG. 2(d). Then, in the step 78, the radio frequency amplifiers 32 and 33 and the intermediate frequency amplifiers 37a and 37b control the gains of the reception pulse waves or the reception pulses obtained in response to the measurement transmission pulse 94 on the basis of the gain control signals 105a, 105b, 105c, 105d and 105e from the automatic gain control signal generating circuit 51, and output the reception pulse waves or the reception pulses with a constant amplitude d. In the step 79, the signal processing circuit 41 calculates the distance to an obstacle in the measurement zone of 4 m to 8 m by a time difference between the measurement transmission pulse 94 and the reception pulse 104e obtained in response to the measurement transmission pulse 94. Then, the procedure returns to the start, and repeats the steps.

Next, the flow from the step 71 to the step 76, the flow from the step 67 to the step 69 and the flow from the step 81 to the step 86 will be described below.

In the case where a plurality of obstacles are not detected in any of the measurement zones in the step 64, or in the case where the pulse width corresponding to any of the measurement zones is larger than the distance resolution in the step 65, the procedure goes to the step 71, and in the step 71, the variable width pulse generating circuit 23 outputs the measurement transmission pulse 92 as the base of the measurement transmission pulse wave in the second round shown in FIG. 2(b). Then, in the step 72, the radio frequency amplifiers 32 and 33 and the intermediate frequency amplifier 37a and 37b control the gains of the reception pulse waves or the reception pulses obtained in response to the measurement transmission pulse 92 on the basis of the gain control signals 105a, 105b, 105c, 105d and 105e from the automatic gain control signal generating circuit 51, and output the reception pulse waves or the reception pulses with a constant amplitude d. In the step 73, the signal processing circuit 41 calculates the distance to an obstacle in the measurement zone of 0 m to 2 m by a time difference between the measurement transmission pulse 92 and the reception pulses 102*a* and 102*b* obtained in response to the measurement transmission pulse 92.

Next, in the step 74, the variable width pulse generating circuit 23 outputs the measurement transmission pulse 93 as the base of the measurement transmission pulse wave in the third round shown in FIG. 2(*c*). Then, in the step 75, the radio frequency amplifiers 32 and 33 and the intermediate frequency amplifier 37*a* and 37*b* control the gains of the reception pulse waves or the reception pulses obtained in response to the measurement transmission pulse 93 on the basis of the gain control signal 105*a*, 105*b*, 105*c*, 105*d* and 105*e* from the automatic gain control signal generating circuit 51, and output the reception pulse waves or the reception pulses with a constant amplitude d. In the step 76, the signal processing circuit 41 calculates the distance to an obstacle in the measurement zone of 2 m to 4 m by a time difference between the measurement transmission pulse 93 and the reception pulse 103*d* obtained in response to the measurement transmission pulse 93. In the embodiment, two obstacles exist in the measurement zone of 2 m to 4 m; however, the distance to one obstacle is calculated. The procedure from the step 77 onward is as described above.

Moreover, in the case where the pulse width only in the fourth round is equal to or less than the distance resolution in the step 66, the procedure goes to the step 81, and in the step 81, the variable width pulse generating circuit 23 outputs the measurement transmission pulse 92 as the base of the measurement transmission pulse wave in the second round shown in FIG. 2(*b*). Then, in the step 82, the radio frequency amplifiers 32 and 33 and the intermediate frequency amplifiers 37*a* and 37*b* control the gains of the reception pulse waves or the reception pulses obtained in response to the measurement transmission pulse 92 on the basis of the gain control signals 105*a*, 105*b*, 105*c*, 105*d* and 105*e* from the automatic gain control signal generating circuit 51, and output the reception pulse waves or the reception pulses with a constant amplitude d. In the step 83, the signal processing circuit 41 calculates the distance to an obstacle in the measurement zones of 0 m to 2 m and 4 m to 8 m by a time difference between the measurement transmission pulse 92 and the reception pulses 102*a*, 102*b* and 102*e*.

Next, in the step 84, the variable width pulse generating circuit 23 outputs the measurement transmission pulse 93 as the base of the measurement transmission pulse wave in the third round shown in FIG. 2(*c*). Then, in the step 85, the radio frequency amplifiers 32 and 33 and the intermediate frequency amplifier 37*a* and 37*b* control the gains of the reception pulse waves or the reception pulses obtained in response to the measurement transmission pulse 93 on the basis of the gain control signals 105*a*, 105*b*, 105*c*, 105*d* and 105*e* from the automatic gain control signal generating circuit 51, and output the reception pulse waves or the reception pulses with a constant amplitude d. In the step 86, the signal processing circuit 41 calculates the distance to an obstacle in the measurement zone of 2 m to 4 m by a time difference between the measurement transmission pulse 93 and the reception pulse 103*d* obtained in response to the measurement transmission pulse 93. In the embodiment, there are two obstacles in the measurement zone of 2 m to 4 m; however, the distance to one obstacle is calculated. Then, the procedure returns to the start, and then repeats the steps.

Moreover, in the case where the pulse widths in the third round and the fourth round are equal to or less than the distance resolution in the step 66, the procedure goes to the step 67, and in the step 67, the variable width pulse generating circuit 23 outputs the measurement transmission pulse 92 as the base of the measurement transmission pulse wave in the second round shown in FIG. 2(*b*). Then, in the step 67, the radio frequency amplifiers 32 and 33 and the intermediate frequency amplifiers 37*a* and 37*b* control the gains of the reception pulse waves or the reception pulses obtained in response to the measurement transmission pulse 92 on the basis of the gain control signals 105*a*, 105*b*, 105*c*, 105*d* and 105*e* from the automatic gain control signal generating circuit 51, and output the reception pulse waves or the reception pulses with a constant amplitude d. In the step 68, the signal processing circuit 41 calculates the distance to an obstacle in the measurement zones of 0 m to 2 m, 2 m to 4 m and 4 m to 8 m by a time difference between the measurement transmission pulse 92 and the reception pulses 102*a*, 102*b*, 102*c*, 102*d* and 102*e* obtained in response to the measurement transmission pulse 92. Then, the procedure returns to the start, and repeats the steps.

By calculating the distances to a plurality of obstacles in such a manner, the pulse radar system 10 calculates the distances to the obstacles by increasing the distance resolution with a measurement transmission pulse wave with a narrow pulse width when the distance resolution with the measurement transmission pulse wave with a wide pulse width is short, so the measurement of the distances to the plurality of obstacles can be maintained. In the embodiment, in the step 66, three determinations are performed so as to measure the distance to the obstacles with the measurement transmission pulse with a pulse width corresponding to each measurement zone; however, in the step 65, in the case where it is determined that the distance between the obstacles in any of the measurement zones is less than the distance resolution, the distances to all obstacles may be measured with the measurement transmission pulse 92 with a short pulse width in the second round shown in FIG. 2(*b*).

The pulse radar system according to the embodiment of the invention is applicable to radar systems for vehicle collision avoidance or lane change assist.

Obviously many modifications and variations of the present invention are possible in the light of the above teachings. It is therefore to be understood that within the scope of the appended claims the invention may be practiced otherwise than as specifically described.

What is claimed is:

1. A pulse radar system comprising:
   a transmitting circuit transmitting a transmission pulse wave that has already been modulated by a transmission pulse;
   a transmitting antenna radiating the transmission pulse wave from the transmitting circuit;
   a receiving antenna receiving a reception pulse wave, the reception pulse wave being radiated from the transmitting antenna as a transmission pulse wave and reflected from an obstacle;
   a receiving circuit controlling a gain, the receiving circuit demodulating the reception pulse wave from the receiving antenna and outputting a reception pulse; and
   a gain control circuit (a) generating a gain control signal corresponding to an amplitude of the reception pulse, the reception pulse being obtained in response to a gain control transmission pulse wave, and (b) controlling, by the gain control signal, a gain of the reception pulse wave or the reception pulse obtained in response to a measurement transmission pulse wave, the gain control transmission pulse wave being transmitted from the transmitting circuit for controlling a gain in the receiving circuit, the measurement transmission pulse wave being transmitted, after the gain control transmission pulse wave, from the transmitting circuit for measuring the distance to the obstacle, wherein the measurement transmission pulse wave has a pulse width that is proportional to a distance from the pulse radar system to a measurement zone, such that, among a plurality of measurement zones predetermined based on a respective distance to a respective obstacle, the greater the respective distance, the wider the pulse width of the respective measurement transmission pulse wave.

2. The pulse radar system according to claim 1, wherein the plurality of measurement zones are determined such that the distance from the pulse radar system to the far end of each of the plurality of the measurement zones configures a geometric series, and the transmitting circuit transmits the measurement transmission pulse wave with a pulse width in proportion to the distance to the far end of each of the plurality of the measurement zones.

3. The pulse radar system according to claim 1, further comprising:

decision circuit making a determination of transmitting the measurement transmission pulse wave for the measurement zone to the transmitting circuit, the measurement transmission pulse wave having the same pulse width as the pulse width of the gain control transmission pulse wave, when the decision circuit detects the existence of a plurality of obstacles in any of the plurality of measurement zones on the basis of the reception pulse obtained in response to the gain control transmission pulse wave, and determines that the pulse width of the measurement transmission pulse wave in a measurement zone belonging the plurality of obstacles is equal to or less than the distance resolution between the plurality of obstacles.

* * * * *